United States Patent [19]

Thaniyavarn

[11] Patent Number: 4,820,009
[45] Date of Patent: Apr. 11, 1989

[54] ELECTROOPTICAL SWITCH AND MODULATOR

[75] Inventor: Suwat Thaniyavarn, Bellevue, Wash.

[73] Assignee: TRW Inc., Redondo Beach, Calif.

[21] Appl. No.: 84,723

[22] Filed: Aug. 13, 1987

[51] Int. Cl.$^4$ .................. G02F 1/01; G02B 6/10; G02B 6/26; G02B 6/42
[52] U.S. Cl. .................. 350/96.13; 350/96.14; 350/96.15; 350/355; 350/356
[58] Field of Search ............ 350/96.13, 96.14, 96.15, 350/355, 356; 332/7.51

[56] References Cited

U.S. PATENT DOCUMENTS 4,012,113 3/1977 Kogelnik et al. .................. 350/96.13
4,690,488 9/1987 Gee et al. .......................... 350/96.14

FOREIGN PATENT DOCUMENTS 113037 5/1986 Japan ................................ 350/96.14

OTHER PUBLICATIONS

Matsui et al. "Optical Branch for Optical Data Distribution" The Transaction of the IECE of Japan, vol. E60, No. 3, Mar. 1977.

Primary Examiner—Eugene R. LaRoche
Assistant Examiner—Michael Shingleton
Attorney, Agent, or Firm—Noel F. Heal; Sol L. Goldstein

[57] ABSTRACT

A directional coupler having two coupled waveguides that receive a single optical input through a Y-junction power splitter, and two outputs from the coupled waveguides. Electrodes positioned over the coupled waveguides apply opposite electric fields to the waveguides and, through the electrooptical effect, modulate the optical outputs. For a zero applied voltage and zero electric field, the outputs are both equal to approximately half of the maximum possible output intensity, and no bias voltage is needed for operation as a modulator. As the voltage is varied from zero, positively or negatively, the optical intensity from either of the outputs varies linearly over a useful range. Moreover, the voltage required to switch full power from one output to the other is less than that required for conventional electrooptical modulators or switches.

7 Claims, 1 Drawing Sheet

ELECTROOPTICAL SWITCH AND MODULATOR

BACKGROUND OF THE INVENTION

This invention relates generally to integrated optical circuitry and, more particularly, to electrooptical modulators, which produce an optical output having an intensity proportional to an input electrical signal. In recent years, devices have been developed to make use of an electrooptical effect in which an electric field induces a change in the refractive index of an electrooptic crystal. An optical field propagating in a waveguide in the crystal is phase modulated by the induced change in refractive index. This effect can be employed in a variety of devices, such as modulators and switches.

There are two principal types of modulator/switches in the prior art: the Mach-Zehnder interferometer and the directional coupler. In the Mach-Zehnder interferometer, an input waveguide is bifurcated into two parallel but relatively widely separated waveguide sections, which are then recombined into a single output waveguide. One of the parallel waveguide sections is influenced by an applied electric field, and the optical wave propagating in this section is phase modulated by the electrooptical effect. When the optical waves from the two parallel sections are recombined, they interfere and produce a resultant output wave whose intensity depends on the electric field applied to the device. For a zero-voltage input signal, the optical waves from the two sections combine constructively and produce a maximum intensity output. As the electrical input signal is increased in voltage, the electric field is increased and the interference of the two waves results in a smaller and smaller output intensity, until a zero output is reached.

Although the Mach-Zehnder interferometer is highly suited for use as a switch, in which the optical output may be switched to an off condition by the application of a suitable input signal, operation of the device as a modulator has at least two drawbacks. First, if the modulator is to have a linear characteristic, the device has to be biased with a direct-current (dc) bias voltage signal, to move its operating point to a linear portion of the device's output characteristic. The most desirable operating point for a modulator produces an output intensity of one-half the maximum output. Application of a dc bias signal necessitates additional components, and possibly a separate power supply. Even more important, the operating point is subject to "drift" over a period of time, due to optical damage caused by the photorefractive effect, and due to charge leakage between the electrodes of the device.

By way of background, in the photorefractive effect, an impurity in the waveguide, such as a ferrous ion ($Fe^{2+}$), will absorb a photon of light and thereby generate free charge carriers in the form of an electron-hole pair. The charge carriers tend to accumulate on opposite sides of the waveguide, or on the top and bottom of the waveguide, depending on the orientation of the optical axis of the crystal. This charge accumulation produces an internal electric field that induces an unwanted change in the refractive index, through the electrooptical effect. As the optical power transmitted through the device is increased, the photorefractive effect increases, and imposes an upper power limit on the operation of the waveguide, beyond which the waveguide tends to operate less efficiently, and may suffer long-term optical damage. This damage is one factor that causes drift in the operating point of the device. Other factors, such as the wavelength of light, and the temperature, can also cause drift in the operating point, which in turn can degrade the device performance.

Another drawback of the Mach-Zehnder interferometer arises because the two parallel waveguide sections of the device must be widely spaced, to avoid any significant optical coupling between them. Because of this large waveguide separation, a dual electrode structure placed over the waveguides, and having an electrode spacing approximately equal to the waveguide spacing, is very inefficient. When a voltage is applied to the electrodes, the electrooptical effect influences the refractive indices of the waveguides, but inefficiency arises because of the smaller electric field, which results from the large electrode spacing. To increase the electric field, a smaller electrode spacing is required. However, since the electrode spacing is smaller than the waveguide spacing, only one waveguide can be subjected to the electric field. Thus the electrooptical effect influences the refractive index of only one of the waveguide sections. This is known as non-push-pull operation, in contrast to the push-pull characteristic of the directional coupler, to be discussed next, in which the electrooptical effect influences two waveguides in opposite directions, using an efficient dual electrode structure having a small electrode spacing that matches the waveguide spacing. In push-pull operation, therefore, the same voltage has practically twice the effect as in non-push-pull operation, since both waveguides are influenced by the same voltage equally, but in opposite senses.

The directional coupler includes two parallel waveguide sections that are spaced closely enough to be closely coupled, but are not otherwise connected together. An input optical signal is applied to one end of one of the waveguide sections and the output is derived from an opposite end of either one of the waveguide sections. The waveguide sections have associated electrodes for applying an electric field, which affects the sections in opposite senses. Unlike the Mach-Zehnder interferometer, therefore, the directional coupler operates in a push-pull manner. The waveguide section length is selected such that, when the electrical signal is zero, all of the optical input energy is coupled rom one waveguide section to the other. The output from one waveguide section is then zero, while the output from the other is at maximum intensity. As the electrical input signal is increased, the degree of coupling between the waveguide sections also changes. The output from one waveguide section increases from zero to a maximum, while the output from the other waveguide section decreases to zero. For operation as a modulator, the device must be dc biased to obtain an operating point on a linear portion of the operating characteristic, preferably at the half-maximum output point, sometimes known as the 3 dB operating point. Therefore, although the directional coupler has a desirable push-pull mode of operation, it still suffers from the principal disadvantage of the Mach-Zehnder interferometer, in that it requires a dc bias, which is subject to drift.

Accordingly, there is still a need for an electrooptical device operable as a switch or modulator, which avoids these disadvantages of the prior art. The present invention fulfill this need, as will become apparent from the following summary.

SUMMARY OF THE INVENTION

The present invention resides in a 1×2 modified electrooptical directional coupler having a practically maximum linear output characteristic at a zero input condition. Therefore, the device of the invention needs no dc bias to operate as a modulator. Moreover, the device of the invention has a higher efficiency than either of the principal types of electrooptical modulators of the prior art.

Briefly, and in general terms, the directional coupler modulator of the invention comprises an input waveguide section, including Y-junction power splitter providing two equal outputs from a single input, a pair of coupled waveguides connected to receive energy from the Y-junction power splitter, and positioned in close coupling proximity to each other, at least one output waveguide connected to the coupled waveguides, and means for applying an electric field in opposite senses to the coupled waveguides. The intensity of optical output from the output waveguide varies linearly with the strength of the applied electric field, over a range of both positive and negative values of field strength. In other words, for a zero electric field the intensity of the optical output has a positive value, which varies linearly as the field strength is increased or decreased. No dc bias is needed, since the zero-voltage operating point of the device is the half-maximum output condition, which is in the middle of a linear portion of the operating characteristic.

In the illustrative embodiment of the invention, the waveguides are formed by in-diffusion of a timanium film into a lithium niobate substrate. In sole applications, only a single output is used, while in others two outputs may be employed, the second output varying in complementary fashion with respect to the first.

The device of the invention can be used either as a modulator or as a 1×2 optical switch. Fabrication is relatively simple, and the required Y junction has a small branching angle, unlike the Mach-Zehnder interferometer, resulting in low scattering losses at the junction. It will be appreciated, therefore, that the invention represents a significant advance in the field of electrooptical devices. Prior to the invention, electrooptical modulators had to be biased to a desired operating point in a linear portion of their operating characteristics. The present invention not only avoids the necessity for dc biasing, but provides a lower switching voltage than is required for a conventional directional coupler switch. Other aspects and advantages of the invention will become apparent from the following more detailed description, taken in conjunction with the accompanying drawings.

DESCRIPTION OF THE PREFERRED EMBODIMENT

Figure 1A:
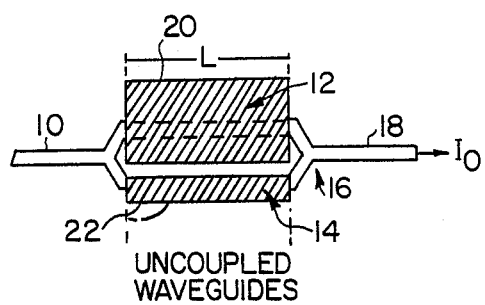
FIG. 1a is a schematic view of a Mach-Zehnder interferometer of the prior art.

As shown in the drawings for purposes of illustration, the present invention is concerned with electrooptical switches and modulators employing the electrooptical effect. In the electrooptical effect, an electric field induces a change in the refractive index of an electrooptic crystal. An optical field propagating in a waveguide in the crystal is phase modulated by the induced change in refractive index, and this phase modulation can be employed in a variety of devices, such as optical switches and electrooptical modulators.

In most devices employing the electrooptical effect, waveguides are fabricated by in-diffusing a metal, such as titanium (Ti), into an electrooptic crystal, such as lithium niobate ($LiNbO_3$) Electrodes are applied over the waveguides, typically separated by an insulating buffer layer, and an electric field is applied to the waveguides by means of a voltage applied across the electrodes. The electric field extends from one electrode to another beneath the surface of the device, and influences the waveguide through which it passes in accordance with the electrooptical effect. The field is practically perpendicular to the surface of the waveguide structure as it passes through the waveguides.

One prior-art device for switching or modulating an optical signal is the Mach-Zehnder interferometer shown in FIG. 1a. The device has an input waveguide, indicated by reference numeral 10, a first Y-junction structure for splitting power from the input waveguide, a pair of uncoupled waveguides 12 and 14 connected to the first Y-junction structure, a second Y-junction structure 16 connected to the other ends of the uncoupled waveguides, for combining power from the two uncoupled waveguides, and an output waveguide 18 connected to the second Y-junction structure 16. The principle of the device is that an input optical signal is split into two equal portions, which are then unequally affected by the application of an electric field, and later combined again to produce a single output. The optical signals in the uncoupled waveguides 12 and 14 are phase modulated by an electric field applied through electrodes 20 and 22 positioned over the waveguides 12 and 14., respectively. When no electric field is applied to the electrodes 20 and 22, the signals from the uncoupled waveguides combine constructively in the second Y-junction structure, and the output from the device is at a maximum, as indicated at 26 in FIG. 1b. As the electric field is increased positively, the outputs from the two uncoupled waveguides move further apart in phase, and interfere in the second Y-junction structure, thereby reducing the intensity of the output optical signal. An increase of the electric field strength to a predetermined level will reduce the output to zero, as indicated at 28. Then the intensity increases again with increasing field strength, in the periodic manner shown in FIG. 1b. Increasing the field strength in the opposite sense from zero also results in the reduction of the output intensity, as indicated at 30, and further increase of the field strength in the negative direction results in a similar periodic variation in output intensity.

Figure 1B:
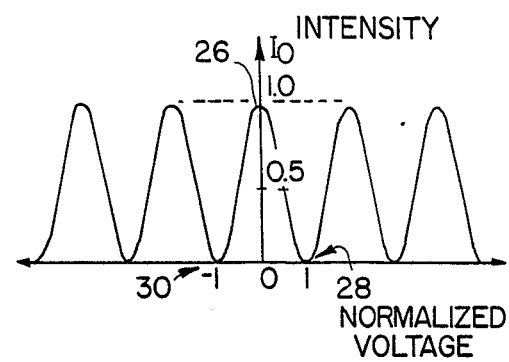
FIG. 1b is a graph showing the output intensity of the device of FIG. 1a, in relation to a voltage signal applied to its electrical input terminals.

To operate the device of FIG. 1a as a modulator with an approximately linear relationship between the electrical signal applied to the electrodes and the optical output intensity, requires that the device be biased to a practically linear portion of the characteristic curve of FIG. 1b. The most desirable operating point is one halfway down the curve between maximum and zero intensity. This is sometimes referred to the 3 dB point, since 3 decibels (dB) represents a change in power levels of fifty percent, and the desired operating point is at fifty percent of the maximum output intensity. As discussed earlier, the need for a dc bias not only increases the complexity of the modulator, but also subjects it to inaccuracies caused by drifting of the bias condition.

Another disadvantage of the Mach-Zehnder interferometer is that, since the waveguides are necessarily uncoupled, the waveguide separation is large. Since electrodes must be closely spaced to each other for maximum field strength in the waveguide, the electrode separation is typically much smaller than the waveguide spacing. Positioning the inter-electrode gap at the midpoint between the waveguides results in the field being concentrated in this region, with minimal effect on the waveguides themselves. A compromise is to position the interelectrode gap nearer to one of the waveguides, which accordingly receives most of the influence of the electric field, while the other waveguide receives practically none. This ensures a differential in the effects on the two waveguides, but is not as efficient as "push-pull" operation, in which both waveguides are affected equally but in opposite senses.

The interferometer of FIG. 1a has yet another disadvantage. Since the waveguides 12 and 14 must be uncoupled optically, they must be spaced apart by a relatively wide distance. Therefore, the Y-junction structures must have a relatively wide branching angle, which gives rise to high scattering losses in the device, or the Y junction must be made longer to achieve the necessary spacing between waveguides.

Figure 2A:
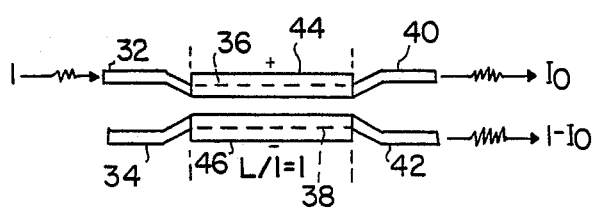
FIG. 2a is a schematic view of a directional coupler of the prior art.

Another prior-art device for switching and modulating an optical signal is the directional coupler shown in FIG. 2a. This includes a pair of input waveguides 32 and 34, a pair of coupled waveguides 36 and 38 connected to the respective input waveguides, and a pair of output waveguides 40 and 42 connected to the coupled waveguides. In essence the device consists of two waveguides that are closely spaced over a portion of their length, to provide optical coupling between them over that portion. Electrodes 44 and 46 are positioned over the coupled waveguides 36 and 38, respectively, to permit the application of an electric field. In contrast to the Mach-Zehnder interferometer, the electrodes in this structure are closely spaced and can apply the electrooptical effect in a "push-pull" manner. In other words, the applied electric field affects the waveguides equally but in opposite senses.

For coupled waveguides, there is a critical coupling length that provides for coupling of all of the energy from one waveguide to the other. The coupling length depends, of course, on a number of physical parameters relating to the size and spacing of the waveguides, the wavelength of light, and so forth.

Figure 2B:
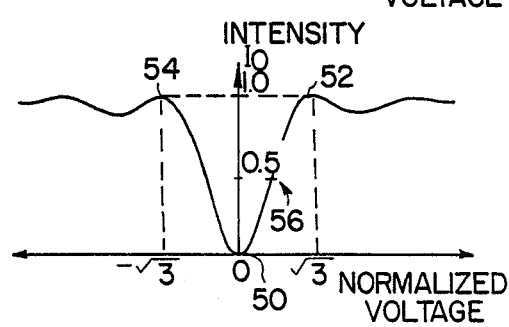
FIG. 2b is a graph showing the output intensity from one optical output of the device of FIG. 2a, in relation to a voltage signal applied to its electrical input terminals.

The lengths of the coupled waveguides 36 and 38 are chosen to provide coupling of the optical energy applied to one of the inputs, in this case 32, to the opposite waveguide 38, when no electrical field is present. Thus, as shown in FIG. 2b when zero voltage is applied to the electrodes the output from waveguide 40 is at a minimum, as indicated at 50 in FIG. 2b, and the output from the other waveguide 42 is at a maximum. As the electric field is increased positively, the intensity of the output from waveguide 40 increases to a maximum, as indicated at 52. Similarly, an increase of the electric field in the opposite direction increases the intensity to the same maximum, as indicated at 54. Again, for operation as a modulator a dc bias voltage must be applied to the electrodes to move the operating point to the 3 dB point indicated at 56, on the linear portion of the operating characteristic. Therefore, although the directional coupler of FIG. 2a avoids the scattering losses associated with the wide-angle Y-junction structures of the Mach-Zehnder interferometer, and operates in a more efficient push-pull manner, the directional coupler still requires biasing for operation as a linear modulator.

Figure 3A:
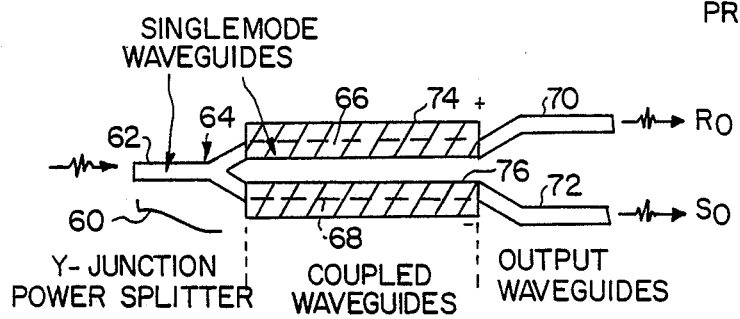
FIG. 3a is a schematic view of a modified directional coupler in accordance with the present invention.

In accordance with the invention, a directional coupler is modified to provide for modulator operation without biasing, and to provide a switching voltage less than that of the conventional directional coupler. The modified directional coupler of the invention is shown in FIG. 3a as including an input waveguide section 60, having an input waveguide 62 and a Y-junction structure 64 for splitting the input power into equal portions. The two outputs of the Y-junction structure are connected to two coupled waveguides 66 and 68, and the coupled waveguides are in turn connected to respective output waveguides 70 and 72. The coupled waveguides 66 and 68 have electrodes 74 and 76 positioned over them, for applying an electric field and influencing the waveguides in accordance with the electrooptical effect.

Figure 3B:
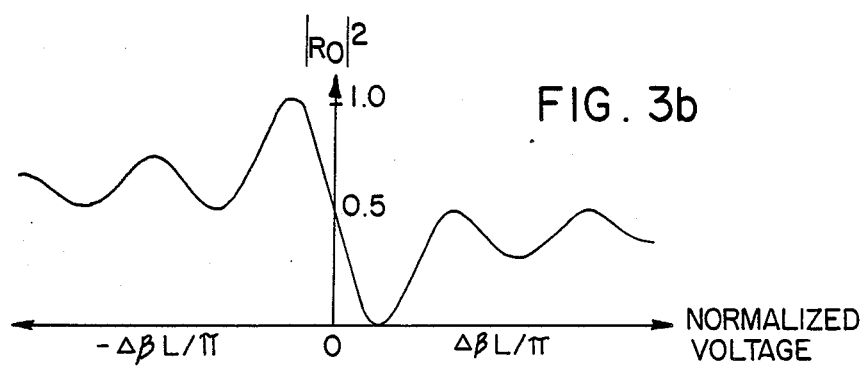
FIG. 3b is a graph showing the output intensity from one optical output of the device, in relation to a voltage signal applied to its electrical input terminals.

When no electrical voltage is applied to the electrodes 74 and 76, the device operates almost in the manner of a conventional power splitter. There is mutual coupling between the coupled waveguides 66 and 68, but the device is completely symmetrical and equal optical intensities are obtained at the two outputs. FIG. 3b shows the output intensity from output waveguide 70 as 0.5 on a normalized intensity scale in which the maximum intensity voltage is increased either positively or negatively, the coupling between the waveguides 66 and 68 is varied accordingly and the intensity of one output rises while the intensity of the other falls. As shown in FIG. 3b, the output intensity of output 70 falls with increasing positive input voltage and rises with increasing negative input voltage. The output characteristic of the other output waveguide 72 is complementary to this, such that the total normalized output is always unity. This effect is independent of the overall interaction length L of the waveguides 66 and 68, but for maximum dynamic range, L is chosen such that:

$$L/l_c = 1/\sqrt{2},$$

where $l_c$ is the minimum interaction length for complete coupling of power from one waveguide to the other.

It will be appreciated from FIG. 3b that no bias signal is needed to achieve a 3 dB operating point, since the desired point is obtained automatically at a zero voltage input level. Moreover, as can be demonstrated mathematically, the voltage needed to switch full intensity optical output from one waveguide to the other is less than that required for the conventional directional coupler.

The modulation and switching characteristics of the device can be analyzed using the coupled mode formalism described by H. Kogelnik and R. Schmidt, IEEE Jour. Quant. Elect., Vol. QE-12, p. 396 (1976). First, let R and S be the optical fields at the two outputs of the structure. $\Delta\beta$ is the electrooptically induced change in propagation constant, and is directly proportional to the applied voltage, V:

$$\Delta\beta = \frac{4\pi}{\lambda} n_e^3 r_{33} \alpha \frac{V}{d},$$

where;
= the optical wavelength,
$n_e$ = the extraordinary refractive index,
d = the electrode spacing,
$r_{33}$ the appropriate electrooptic coefficient, a term of a coefficient matrix defining the relationship between an applied electric field and the resultant change in refractive index, and is a constant for a given material, and
$\alpha$ = a parameter indicating the overlapping integral between the applied electric field and the optical field. The value of $\alpha$ is between 0 and 1.

The normalized output field is given by the general expression:

$$\begin{pmatrix} R \\ S \end{pmatrix} = \frac{1}{\sqrt{2}} \begin{pmatrix} A & -jB \\ -jB^* & A^* \end{pmatrix} \begin{pmatrix} 1 \\ 1 \end{pmatrix}$$

where:

$A = \cos(\pi r/2) + jx/r \sin(\pi r/2)$, $B = x/r \sin(\pi r/2)$,
$y = L/l_c$, the normalized electrode length,
$l_c$ = the coupling length,
$x = \Delta\beta L/\pi$, the normalized applied voltage, and
$r^2 = x^2 + y^2$, The solution for optical power $|R|^2$, $|S|^2$ is given by:

$$|R|^2 = \tfrac{1}{2}\left[1 - \frac{2xy}{r^2}\sin^2\left(\frac{\pi r}{2}\right)\right],$$

$$|S|^2 = 1 - |R|^2.$$

A modulator diagram for $|R|^2$ can be constructed using this expression. It will be noted from the expression that, if the normalized length and normalized voltage are:

$$y = 1/\sqrt{2} \simeq .7, \text{ and}$$

$$x = +1/\sqrt{2} \text{ or } -1/\sqrt{2},$$

then the value of $|R|^2$ is meaning that the light can be switched between the two outputs with the application of these values of normalized voltage.

The switching condition for the device, i.e. the normalized voltage needed to effect switching from one output to the other is $\sqrt{2}\pi$, which is lower than for a conventional directional coupler ($\sqrt{3}\pi$). Furthermore, although a Mach-Zehnder interferometer modulator has a theoretically lower switching requirement ($\pi$), the use of a push-pull dual electrode configuration, as in the present invention, effectively cuts the voltage requirement in half, and the switching requirement for the device of the invention is, therefore, lower than any prior-art device.

Although the device of the invention may be fabricated in a variety of acceptable ways, one preferred technique is to form the waveguides on a z-cut lithium niobate (LiNbO$_3$) crystal, by diffusing an approximately 48 nanometer (nm) thick titanium film at approximately 1020° C for 6 hours in a wet argon atmosphere. A silicon dioxide (SiO$_2$) film of approximately 250 nm thickness can be used as a buffer layer between the electrodes and the waveguides. The electrodes are formed from an aluminum film approximately 200 nm thick. The electrode gap is approximately 7 $\mu$m, which is the same as the waveguide spacing, and the waveguides are approximately 6 $\mu$m wide. This device was tested at a wavelength $\lambda$ of 1.3 $\mu$m, at which the waveguide supports a single TM (transverse magnetic) mode of oscillation. A coupled waveguide length (L) of 1 cm provides, with the other parameters, a normalized waveguide length of approximately, 0.7, as desired. The switching voltage for this configuration is approximately 7 volts, and an extinction ratio of less than $-20$ dB was measured, meaning that the output switched to the "off" condition has a power level that is at least 20 dB below that of the "on" output waveguide.

It will be appreciated from the foregoing that the present invention represents a significant advance in the field of electrooptical switches and modulators. In particular, the invention provides an optical switch that is more efficient than prior optical switches, and provides a high-speed modulator that needs no dc bias to reach its most effective operating point. Moreover, the device is fully compatible with a push-pull traveling-wave dual-electrode structure, which makes it ideal for use as an ultra-high-speed external modulator, especially in systems in which stability of a dc bias point is of concern. It will also be appreciated that, although an embodiment of the invention has been described in detail for purposes of illustration, various modifications may be made without departing from the spirit and scope of the invention. Accordingly, the invention is not to be limited except as by the appended claims.

I claim:
1. An electrooptical modulator, comprising:
   an input waveguide section, including a power splitter providing two equal outputs from a single input;
   a pair of coupled waveguides connected to receive energy from the power splitter, and position in close coupling proximity to each other;
   an output waveguide connected to one of the coupled waveguides; and
   means for applying an electric field to the coupled waveguides;
   whereby the intensity of optical output from the output waveguide varies approximately linearly with the strength of the applied electric field, over a range of both positive and negative values of field strength and without a dc bias being applied to the modulator.

2. An electrooptical modulator as defined in claim 1 wherein:
   the power splitter includes a Y-junction structure.

3. An electrooptical modulator as defined in claim 1, wherein;
   the means for applying an electric field affects the pair of coupled waveguides in opposite senses.

4. An electrooptical modulator as defined in claim 1, wherein:

there are two output waveguides, connected one to each of the coupled waveguides.

5. An electrooptical modulator as defined in claim 4, wherein:
the input waveguide section, the coupled waveguides, and the output waveguides are all formed from titanium diffused into a lithium niobate crystal.

6. An electrooptical modulator as defined in claim 5, wherein:
the means for applying an electric field includes a pair of electrodes formed over the coupled waveguides.

7. An electrooptical modulator as defined in claim 1, wherein:
the length of the coupled waveguides is selected to be approximately seventy percent of the coupling length of the coupled waveguides.

* * * * *